US009815931B2

(12) United States Patent
Prissok et al.

(10) Patent No.: US 9,815,931 B2
(45) Date of Patent: *Nov. 14, 2017

(54) PRODUCING RIGID POLYMER FOAMS

(71) Applicant: BASF SE, Ludwigshafen (DE)

(72) Inventors: Frank Prissok, Lemfoerde (DE); Michael Harms, Diepholz (DE)

(73) Assignee: BASF SE, Ludwigshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/772,971

(22) Filed: Feb. 21, 2013

(65) Prior Publication Data

US 2013/0225708 A1    Aug. 29, 2013

Related U.S. Application Data

(60) Provisional application No. 61/603,963, filed on Feb. 28, 2012, provisional application No. 61/615,896, filed on Mar. 27, 2012.

(51) Int. Cl.
| | | |
|---|---|---|
| C08G 18/08 | (2006.01) | |
| C08G 18/66 | (2006.01) | |
| C08G 18/76 | (2006.01) | |
| C08G 18/34 | (2006.01) | |
| C08G 101/00 | (2006.01) | |

(52) U.S. Cl.
CPC ......... C08G 18/14 (2013.01); C08G 18/6692 (2013.01); C08G 18/7664 (2013.01); C08G 18/34 (2013.01); C08G 2101/0008 (2013.01)

(58) Field of Classification Search
CPC ............................ C08G 18/34; C08G 18/6692
USPC .......................................................... 521/170
See application file for complete search history.

(56) References Cited

U.S. PATENT DOCUMENTS

| | | | | |
|---|---|---|---|---|
| 3,476,933 | A | | 11/1969 | Mendelsohn |
| 3,557,027 | A | * | 1/1971 | Marsh, Jr. ........................ 21/156 |
| 3,637,542 | A | | 1/1972 | Doerge et al. |
| 3,647,724 | A | * | 3/1972 | Doerge et al. .................... 21/157 |
| 4,069,173 | A | * | 1/1978 | Kauffman et al. ............... 521/157 |
| 4,298,529 | A | * | 11/1981 | Ueda .................... C07D 319/06 540/222 |
| 4,444,914 | A | * | 4/1984 | Smith et al. ..................... 521/130 |
| 4,473,666 | A | * | 9/1984 | Casati et al. .................... 521/115 |
| 5,143,945 | A | * | 9/1992 | Bodnar et al. .................. 521/130 |
| 5,162,385 | A | * | 11/1992 | Hartwig ............... C08G 18/092 521/118 |
| 5,426,124 | A | * | 6/1995 | Neuhaus et al. .................. 521/51 |
| 5,464,560 | A | * | 11/1995 | Schilling et al. ........ 252/182.24 |
| 5,527,876 | A | * | 6/1996 | Kluth et al. ..................... 528/198 |
| 5,885,479 | A | * | 3/1999 | Chakrabarti et al. .... 252/182.24 |
| 6,096,416 | A | * | 8/2000 | Altenberg ................... 428/317.7 |
| 6,602,927 | B1 | * | 8/2003 | Rothacker ....................... 521/130 |
| 2002/0193459 | A1 | * | 12/2002 | Haseyama et al. ............. 521/155 |
| 2007/0197760 | A1 | * | 8/2007 | Kometani et al. ............... 528/48 |
| 2009/0099273 | A1 | * | 4/2009 | Williams ........... C08G 18/1816 521/94 |
| 2009/0312447 | A1 | * | 12/2009 | Hickey ......................... 521/131 |
| 2009/0313909 | A1 | * | 12/2009 | Clatty et al. .................... 52/2.11 |
| 2012/0142801 | A1 | | 6/2012 | Prissok et al. |
| 2013/0137787 | A1 | * | 5/2013 | Burdeniuc et al. ........... 521/115 |

FOREIGN PATENT DOCUMENTS

| | | |
|---|---|---|
| DE | 42 02 758 A1 | 8/1993 |
| DE | 198 04 911 A1 | 8/1999 |
| EP | 0 527 613 A2 | 2/1993 |
| GB | 1137263 | 12/1968 |
| JP | 6-199977 | 7/1994 |
| JP | 7-503037 A | 3/1995 |
| JP | 2006-137870 | 6/2006 |

OTHER PUBLICATIONS

U.S. Appl. No. 13/961,246, filed Aug. 7, 2013, Mueller-Cristadoro et al.
International Search Report issued Dec. 10, 2013 in PCT/EP2013/053861 with English Translation of Category of Cited Documents.
Anne C. Schuemacher, et al., "Condensation Between Isocyanates and Carboxylic Acids in the Presence of 4-Dimethylaminopyridine (DMAP), a Mild and Efficient Synthesis of Amides", Synthesis, 2001, No. 2, pp. 243-246.
Ian S. Blagbrough, et al., "The Condensation Reaction between Isocyanates and Carboxylic Acids. A Practical Synthesis of Substituted Amides and Anilides," Tetrahedron Letters, vol. 27, No. 11, 1986, pp. 1251-1254.
Augustin T. Chen, et al., "New High-Temperature Thermoplastic Elastomers", Rubber Chemistry and Technology, vol. 59, Sep. 1-4, 1985, pp. 615-622.
Han Mo Jeong, et al., "Phase structure and properties of some thermoplastic polyesteramide elastomers", Polymer, vol. 39, No. 2, 1998, pp. 459-465.
Office Action mailed Nov. 15, 2016 in corr. Japanese Patent App. No. 2014-559192 filed Feb. 27, 2013 (partial English translation only).

* cited by examiner

*Primary Examiner* — Melissa A Rioja
(74) *Attorney, Agent, or Firm* — Oblon, McClelland, Maier & Neustadt, L.L.P.

(57) ABSTRACT

A process for producing a rigid polymer foam comprises reacting components A to C in the presence of component D or an isocyanate-functional prepolymer of components A and B with component C in the presence of component D, the total amount of which is 100 wt %, (A) 35 to 65 wt % of at least one polyisocyanate component A, (B) 5 to 50 wt % of at least one polyol component B, (C) 1 to 59 wt % of at least one polycarboxylic acid component C, and (D) 0.01 to 3 wt % of at least one Lewis base component D, wherein the reaction takes place with release of carbon dioxide.

13 Claims, No Drawings

PRODUCING RIGID POLYMER FOAMS

The present invention relates to a process for producing a rigid polymer foam, to the rigid polymer foam thus obtainable and to its use.

Polymer foams, such as polyurethane and polyurethane-polyurea foams based on di- or polyisocyanates are well known. Rigid polyurethane phases have a distinctly lower melting temperature compared with a rigid polyamide phase which has a decisive influence on using the materials at high temperatures.

It is further known to react carboxylic acids with isocyanates to form mixed carbamic an hydrides with partial further reaction to form amides. The reaction and the reaction mechanism are described for example by R. W. Hoffman in Synthesis 2001, No. 2, 243-246 and I. Scott in Tetrahedron Letters, Vol. 27, No. 11, pp 1251-1254, 1986.

Oligomeric compounds that use a reaction between a diisocyanate and a dicarboxylic acid are described by K. Onder in Rubber Chemistry and Technology, Vol. 59, pages 615-622 and by T. O. Ahn in Polymer Vol. 39, No. 2, pp. 459-456, 1998.

EP 0 527 613 A2 describes the production of foams comprising amide groups. These are produced using organic polyisocyanates and polyfunctional organic acids. The foams are produced using an addition reaction by reacting an organic polyisocyanate with the reaction product of a polyoxyalkylene and of an organic polycarboxylic acid component. The two isocyanate groups react with a compound which generates carbon dioxide. This compound is the reaction product of a polyoxyalkylene polyamine or of a polyol component with an organic polycarboxylic acid component. The polyoxyalkylenepolyamine or polyol component has an average molecular weight of 200 to 5000 g/mol. The starting temperature for the reaction is at least 150° C., while the reaction time is in a range from half an hour to twelve hours.

DE 42 02 758 A1 describes a foam comprising urethane and amide groups which is obtainable by using polyhydroxycarboxylic acids having a chain length of 8 to 200 carbon atoms. These polyhydroxycarboxylic acids are conveniently produced by ring-opening epoxidized unsaturated fatty acids with hydroxyl-containing compounds, such as water, alcohol or hydroxycarboxylic acids. Foam densities range from 33 to 190 kg/m$^3$.

JP 2006-137870 A describes a process for producing a polyamide foam and the use of this polyamide foam. A polyisocyanate component and a polyester polycarboxylic acid component are made to react with each other using a phosphine oxide as catalyst. The reaction mixture is heated to 170° C. at least.

The known polyurethane-polyamide foams are disadvantageous because the starting materials either only react at comparatively high temperatures or do not react to completion, and their density is not in line with standard polyurethane recipes.

The present invention has for its object to provide rigid polymer foams that are dimensionally stable even at high temperatures in the presence of moisture and/or at high pressures, so that they can even be used in the engine, transmission or exhaust environment, and their methods of making. The rigid polymer foams shall further have advantageous properties with respect to sustained elasticity, abrasion resistance, tensile strength, tongue tear strength and compressive stresses. The present invention further has for its object to provide a rigid polymer foam comprising polyamide groups obtainable by reaction of diisocyanate components with dicarboxylic acid components within a short time and preferably without the need for additional blowing agents.

These objects are achieved, in accordance with the present invention, by a process for producing a rigid polymer foam comprising reacting components A to C in the presence of component D or an isocyanate-functional prepolymer of components A and B with component C in the presence of component D, the total amount of which is 100 wt %, (A) 35 to 65 wt %, preferably 40 to 62 wt % and especially 42 to 55 wt % of at least one polyisocyanate component A, (B) 5 to 50 wt %, preferably 10 to 40 wt % and especially 15 to 30 wt % of at least one polyol component B, (C) 1 to 59 wt %, preferably 2 to 50 wt % and especially 5 to 45 wt % of at least one polycarboxylic acid component C, and (D) 0.01 to 3 wt %, preferably 0.02 to 2 wt % and especially 0.05 to 1 wt % of at least one Lewis base component D, wherein the reaction takes place with release of carbon dioxide. Further ingredients may be included in the reaction mixture in addition to components A to D.

The process of the present invention involves the reaction of a carboxylic acid group with an isocyanate group to form a mixed carbamic anhydride which reacts further to form an amide. $CO_2$ elimination from the carbamic anhydrides using Lewis bases as catalysts provides the polymer foams at a similar rate to, for example, polymer foams based on polyurethane. Since this reaction releases the blowing gas from the components themselves, it can be carried out in the absence of water and blowing agent.

A rigid polymer foam can be understood as meaning in the context of the present invention that, in the course of the production of the rigid polymer foam, the reaction mixture undergoes a volume change until the reaction has finally ended, even after the main reaction has ended, since the foam matrix is still viscous and the gas can continue to expand within the foam. It is advantageously possible for the polymer foam to include cells/cavities within the polymer foam and also on the surface of the polymer foam.

The rigid polymer foams of the present invention have a compressive stress at 10% relative deformation of not less than 80 kPa, preferably not less than 150 kPa and more preferably not less than 180 kPa. The rigid polymer foam further has a DIN ISO 4590 closed-cell content of not less than 70% and preferably above 85%. Further details concerning rigid polymer foams of the present invention appear in "Kunststoffhandbuch, Band 7, Polyurethane", Carl Hanser Verlag, 3rd edition 1993, chapter 6. DIN 7726 can also be referenced for polyurethane foams.

The present invention utilizes the Lewis base component as an accelerant or catalyst in the reaction, making it possible for the polyaddition and the polycondensation to be carried out uniformly and at a high rate to ensure that not only the molecular weight buildup and the gelling of the resulting polymer but also the expansive foaming, especially due to the released carbon dioxide, take place simultaneously so as to form a stable uniform foam which then solidifies. The inventors found that the use of one Lewis base component for both the elementary reactions is sufficient and that the reactions coordinate with each other such that gas production and foam formation are simultaneously accompanied by a viscosity increase which leads to a uniform foam being produced. Once the viscosity has increased too much, foam formation can be impaired. If, during foam formation, the viscosity increase is insufficient and/or no gelling whatsoever has ensued, the produced gas is able to rise through the liquid polymer and escape therefrom and/or accumulate at the surface, preventing the formation of a uniform foam structure. These problems are overcome in the process of the present invention, resulting in a rigid polymer foam having a uniform cellular distribution throughout the entire cross section of the rigid polymer foam.

The present inventors further found that when the components are used in the amounts of the present invention, carbon dioxide formation is sufficient to produce a suitable rigid polymer foam, eliminating the need to add external blowing agents. When a foam of lower density is desired, however, external blowing agents can also be additionally used. It is preferable to dispense with the addition of external blowing agents. Similarly, in accordance with the present invention, any addition of water to the reaction mixture or the presence of water in the reaction mixture is avoided. The reaction is preferably carried out waterlessly, i.e., in the absence of water. There is preferably no water in the reaction mixture.

The individual components used according to the present invention will now be more particularly elucidated.

For the purposes of the present invention, at least one polyisocyanate component, herein also referred to as component A, comprises polyfunctional aromatic and/or aliphatic isocyanates, for example diisocyanates.

It may be advantageous for the polyisocyanate component to have an isocyanate group functionality in the range from 1.8 to 5.0, more preferably in the range from 1.9 to 3.5 and most preferably in the range from 2.0 to 3.0.

It is preferable for the suitable polyfunctional isocyanates to comprise on average from 2 to not more than 4 NCO groups. Examples of suitable isocyanates are 1,5-naphthylene diisocyanate, xylylene diisocyanate (XDI), tetramethylxylylene diisocyanate (TMXDI), diphenyldimethylmethane diisocyanate derivatives, di- and tetraalkyldiphenylmethane diisocyanate, 4,4-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4-diisocyanatophenyl-perfluorethane, tetramethoxybutane 1,4-diisocyanate, butane 1,4-diisocyanate, hexane 1,6-diisocyanate (HDI), dicyclohexylmethane diisocyanate, cyclohexane 1,4-diiso-cyanate, ethylene diisocyanate, bisisocyanatoethyl phthalate, also polyisocyanates with reactive halogen atoms, such as 1-chloromethylphenyl 2,4-diisocyanate, 1-bromo-methylphenyl 2,6-diisocyanate, 3,3-bischloromethyl ether 4,4-diphenyl diisocyanate.

Further important diisocyanates are trimethylhexamethylene diisocyanate, 1,12-diisocyanatododecane and dimer fatty acid diisocyanate.

4,4-Diphenylmethane diisocyanate (MDI), hydrogenated MDI ($H_{12}$MDI) and polymeric methylene diphenyl diisocyanate are particularly suitable and the polymeric methylene diphenyl diisocyanate advantageously has a functionality of not less than 2.2.

The process of the present invention involves the reaction of 35-65 wt % of at least one polyisocyanate component, preferably of 40-60 wt % of at least one polyisocyanate component and more preferably of 42-55 wt % of at least one polyisocyanate component. More particularly, component A can be contacted with the particular components B, C and D together, in succession or with each one first. For example, components A and B can be reacted to produce an isocyanate-functional prepolymer. This prepolymer in turn has an isocyanate functionality of preferably 2.5 to 3.

In a further embodiment of the process according to the present invention, component A has an average molecular weight in the range from 100 g/mol to 750 g/mol, advantageously in the range from 130 g/mol to 500 g/mol and especially in the range from 250 g/mol to 450 g/mol. This polyisocyanate component can ideally provide a high density of amide bonds per polymer unit which is produced in the process of the present invention. This makes it possible to generate a rigid phase having advantageous properties. Amides have higher melting points and higher decomposition temperatures than urethanes. Rigid polymer foams having a higher proportion of amide bonds therefore likewise have a higher melting point and a higher decomposition temperature and hence are particularly suitable for high-temperature applications, for example as insulating material in the engine compartment of a motor vehicle.

For the purposes of the present invention, at least one polyol component B, herein also referred to as component B, comprises organic compounds having two or more free hydroxyl groups. These compounds are preferably free of other functional groups or reactive groups, such as acid groups. Preferably, polyol component B is a polyether polyol or a polyester polyol. Examples thereof are a polyoxyalkylene, a polyoxyalkenyl, a polyester diol, a polyesterol, a polyether glycol, especially a polypropylene glycol, a polyethylene glycol, a polypropylene glycol, a polypropylene ethylene glycol, or mixtures thereof. A mixture can be understood as meaning for example a copolymer, but also a mixture of polymers. The polyglycol component preferably has an average molecular weight in the range from 200 g/mol to 6000 g/mol, especially in the range from 250 g/mol to 3000 g/mol and more preferably in the range from 300 g/mol to 800 g/mol.

In a further embodiment of the process according to the present invention, component B has an OH number of 10 mg KOH/g to 1000 mg KOH/g. More particularly, component B can have an OH number of 30 mg KOH/g to 500 mg KOH/g.

Components A and (B+C) may be used in a molar ratio of isocyanate groups on component A to isocyanate-reactive groups, such as hydroxyl or carboxylic acid groups on components B and C in the range of preferably 10:1 to 1:2, more preferably from 5:1 to 1:1.5 and especially from 3:1 to 1:1.

For the purposes of the present invention, at least one polycarboxylic acid compound, preferably dicarboxylic acid component, herein also referred to as component C, comprises an organic compound having at least or exactly two carboxyl groups, —COOH, or an acid anhydride thereof. The carboxyl groups can be bonded to alkyl or cycloalkyl moieties or to aromatic moieties. Aliphatic, aromatic, araliphatic or alkyl-aromatic polycarboxylic acids may be concerned, which may also contain heteroatoms, especially nitrogen atoms and other functional groups, e.g., hydroxyl groups or keto groups. The poly- or dicarboxylic acid component can be used in the processes of the present invention at from 1 to 59 wt %, advantageously at from 2 to 50 wt % and more preferably at from 5 to 45 wt % in the reaction. Preferably, component C does not contain any hydroxyl groups in addition to the carboxyl groups. Hence polyhydroxy carboxylic acids are preferably not concerned. It may be particularly advantageous to use poly- or dicarboxylic acids which exclusively have carboxyl groups and/or anhydrides thereof as functional groups. It may similarly be possible to use for example, in a further variant, salts or esters of component C, for example the salt formed by the carboxylate and the ion of an alkaline earth metal. Preferably, free acid groups are present in the reaction. Examples of suitable polycarboxylic acids are $C_{3-12}$alkanepolycarboxylic acids or -dicarboxylic acids, for example malonic acid, succinic acid, glutaric acid, adipic acid or higher dicarboxylic acids, which may also be $C_{1-3}$alkyl substituted. Examples of suitable aromatic poly- or dicarboxylic acids are phthalic acid, isophthalic acid, terephthalic acid. Further possibilities include aliphatic unsaturated poly- or dicarboxylic acid, such as fumaric acid or maleic acid and keto-containing dicarboxylic acids, such as oxaloacetic acid.

It is preferable for component C to be used in the reaction as an at least partial, preferably complete solute in component B. Even polycarboxylic acids which are solid at the reaction temperature are thus simple to introduce into the reaction or to be more precise the reaction mixture.

For the purposes of the present invention, at least one Lewis base component, herein also referred to as component D, may be understood as meaning a compound capable of providing electron pairs, for example in accordance with the meaning of the term "Lewis base" in chemistry. Preferably, the free electron pair is in an compound, but can also be bound to a metal or to an organometallic compound.

The Lewis base is preferably used in an amount of from 0.02 to 2 wt % and more preferably 0.05 to 1 wt %.

The total amounts of components A to D sum to 100 wt %. This means that the reaction mixture can but need not contain further components other than A to D. The quantitative recitations of components A to D are standardized with regard to their sum total.

In a preferred embodiment of the process according to the present invention, the Lewis base component is selected from the group consisting of N-methylimidazole, melamine, guanidine, cyanuric acid, dicyandiamide or their derivatives. Ideally, the Lewis base is able to generate the formation of a carboxylate from the carboxylic acid, so that this carboxylate can quickly react with the diisocyanate component. The Lewis base likewise functions as a catalyst for the detachment of $CO_2$ in the reaction of the diisocyanate component with the dicarboxylic acid component. A synergistic effect may particularly advantageously result from the formation of the carboxylate and the detachment of $CO_2$ using the Lewis base, and so only one catalyst or accelerant is needed.

The process for producing a rigid polymer foam can be carried out at a starting temperature in the range from at least 15° C. to at most 100° C., more preferably from at least preferably 15° C. to at most 80° C., especially at a starting temperature from at least 25° C. to at most 75° C. and more preferably at a starting temperature from at least 30° C. to at most 70° C. The reaction of the abovementioned components can take place at atmospheric pressure. This reduces for example the energy requirements of producing the rigid polymer foam. It is similarly possible to circumvent the disadvantageous effect of a higher temperature on the formation of a scorched core, and gas production/foam formation and viscosity increase are well matched to each other, as described above.

The reactor and the reaction mixture are controlled to the temperature at which the reaction is started. The temperature can rise in the course of the reaction. Typically, the receptacle in which the reaction takes place is not separately heated or cooled, and so the heat of reaction is removed to the environment via the receptacle walls or the air. Since the reaction is accelerated by the Lewis base component used in the process of the present invention in that the Lewis base acts as a catalyst, the process of the present invention provides complete and rapid further reaction between diisocyanate components and dicarboxylic acid components to form an amide component. But advantageously the reaction need not be carried out under the conditions of an elevated temperature, as described in EP 0 527 613 A2 for example.

In a further embodiment of the process according to the present invention, the reaction can be carried out with short-chain dicarboxylic acids and di- or polyisocyanates. This can make it possible to produce block copolymers for example.

In a preferred embodiment of the process according to the invention, the reaction to form the thermoplastic polymer foam starts after at least 3 to 90 seconds, especially after 5 to 70 seconds and most preferably after 5 to 40 seconds. The reaction starting is to be understood as meaning that components A, B, C and D react to form the corresponding product(s) after they have been brought into contact with one another. Advantageously, externally heated components or reactors are not needed.

In a further embodiment of the process according to the present invention, the density of the rigid polymer foam is preferably in the range from 10 g/l to 200 g/l, more preferably in the range from 12 g/l to 80 g/l and especially in the range from 15 g/l to 50 g/l. This makes it advantageously possible to obtain a foam density which is very difficult to obtain with polyurethanes. But ideally diisocyanate components and thus likewise similar conditions in the production can be used.

In a further embodiment of the process according to the present invention, the reaction takes place with a foam stabilizer and the stabilizer preferably comprises a siloxane copolymer. This polysiloxane copolymer is preferably selected from the group comprising polyether-polysiloxane copolymers, such as polyether-polydimethylsiloxane copolymers.

The present invention further provides a rigid polymer foam deriving from polyisocyanates, polyols or an isocyanate-functional prepolymer thereof and also polycarboxylic acids as monomers, comprising urethane and amide groups in the polymer main chain and having a foam density of 10 g/l to 200 g/l, and also the use of said rigid polymer foam for thermal insulation or as core foam.

The present invention further provides a polyol mixture comprising components B, C and D as defined above, wherein component C may be a solute in component B and wherein the above quantitative recitations for components B, C and D, the sum total of which is in the range from 35 to 65 wt %, preferably from 38 to 60 wt % and especially from 45 to 58 wt %, only indicate the quantitative ratios between components B, C and D.

For the purposes of the present invention, a polyaddition product is a chemical reaction product where the reactants react with each or one another without the formation of low molecular weight by-products, as for example water or $CO_2$ in urethane formation for example. For the purposes of the present invention, a polycondensation product can be understood as meaning a product which, in the reaction of two reactants, provides at least one low molecular by-product, for example carbon dioxide in amide formation. Accordingly, a polyglycol component can combine with a diisocyanate component to form a polyaddition product and a dicarboxylic acid component with the diisocyanate component to form a carbamic anhydride with further reaction to form an amide compound, by $CO_2$ formation, in a polycondensation reaction.

The present invention further provides for the use of the rigid polymer foam of the present invention for thermal insulation or as engineering material.

For thermal insulation, the use preferably takes the form of being for production of refrigerating or freezing appliances, appliances for hot water preparation or storage or parts thereof, or for thermal insulation of buildings, vehicles or appliances.

In the above applications especially, the rigid polymer foam of the present invention is used to form the thermal insulating layer in the devices or appliances, buildings or vehicles. The rigid polymer foam of the present invention can also be used to form the entire housing or outer shells of appliances, buildings or vehicles.

As an engineering material, the rigid polymer foam of the present invention is preferably used as core foam for producing sandwich composites. Sandwich composites of this type typically have a core of a rigid polymer foam and are paneled or sheathed with a fiberglass-reinforced plastic. This sheathing or paneling plastic is freely choosable. Epoxy or polyester resins are frequently concerned.

Sandwich composites of this type are preferentially used in the automotive, shipbuilding, building construction or wind power industry.

For the purposes of the present invention, vehicles are air, land or water vehicles, especially airplanes, automobiles or ships.

A person skilled in the art will be aware of further uses for the rigid polymer foams of the present invention.

The examples which follow will further elucidate the invention:

EXAMPLES

The examples hereinbelow demonstrate the production and properties of rigid polymer foams. The materials of the present invention were produced in the lab using a blender. Unless otherwise stated, the reaction was carried out at ambient temperature (22° C.) as starting temperature, i.e., the components were reacted at ambient temperature in a non-temperature-controlled reactor or receptacle, and the heat of reaction was moved to the environment.

The following rigid polymer foams were produced in the lab in accordance with table 1. The room temperature solid dicarboxylic acid components were first melted and dissolved in the polyol component. The diol-dicarboxylic acid mixture was then reacted with a polyisocyanate. Foam cubes having a volume of 20 l were produced and subsequently subjected to mechanical testing. The composition of the starting substances and also the results of the testing are reported in table 1.

In addition to the inventive rigid polymer foams of examples 1, 2 and 3, two hitherto customary rigid polymer foams were produced from known compositions as comparative examples 1 and 2. This required the use of mixtures of multiple polyols and mixtures of multiple catalysts to arrive at usable rigid polymer foams.

Such a multiplicity of polyol and catalyst components are no longer needed in the process of the present invention. Rigid polymer foams having outstanding properties were obtained with just a single polyol component and with just a single catalyst, as is apparent from the tables hereinbelow.

TABLE 1

|  | Ex. 1 | Ex. 2 | Ex. 3 | Comp. 1 | Comp. 2 |
|---|---|---|---|---|---|
| acid 1 | 9.8 |  |  |  |  |
| acid 2 |  | 13.5 |  |  |  |
| acid 3 |  |  | 34.9 |  |  |
| acid 4 |  |  |  | 0.6 |  |
| polyol 1 | 28.7 | 31.5 | 17.1 |  | 7.5 |
| polyol 2 |  |  |  | 18.3 |  |
| polyol 3 |  |  |  | 5.7 |  |
| polyol 4 |  |  |  | 3 |  |
| polyol 5 |  |  |  |  | 22.9 |
| polyol 6 |  |  |  |  | 2.2 |
| polyol 7 |  |  |  |  | 6.7 |
| iso 1 | 61 | 54 | 46.8 |  | 58.3 |
| iso 2 |  |  |  | 57.6 |  |
| stabilizer 1 | 0.4 | 0.8 | 0.8 |  |  |
| stabilizer 2 |  |  |  | 0.8 |  |
| stabilizer 3 |  |  |  |  | 0.2 |
| stabilizer 4 |  |  |  |  | 0.5 |
| cat 1 | 0.1 | 0.2 | 0.4 |  | 0.1 |
| cat 2 |  |  |  | 0.9 |  |
| cat 3 |  |  |  | 0.5 |  |
| cat 4 |  |  |  |  | 0.2 |
| blowing agent 1 |  |  |  | 3.0 |  |
| blowing agent 2 |  |  |  |  | 1.5 |
| additive |  |  |  | 9.5 |  |

The meanings are:
acid 1: pentanedioic acid M = 132 g/mol
acid 2: methylenesuccinic acid M = 130 g/mol
acid 3: dicarboxylic acid mixture with average molecular weight 800 g/mol
acid 4: 85 parts of methanoic acid in 15 parts of water
polyol 1: polypropylene glycol with average molecular weight (MW) 420 g/mol
polyol 2: polyester diol (phthalic acid-oleic acid polyester diol) with average molar mass 600 g/l
polyol 3: polyesterol (phthalic acid-oleic acid polyester diol) with average molar mass 510 g/l and average functionality 2.2
polyol 4: polyethylene glycol with average molecular weight (MW) 600 g/mol
polyol 5: polypropylene glycol with average molecular weight (MW) 500 g/mol
polyol 6: polypropylene glycol with average molecular weight (MW) 1040 g/mol
polyol 7: polypropylene glycol with average molecular weight (MW) 1070 g/mol
additive: tri-2-chloroisopropyl phosphate
blowing agent 1: n-pentane
blowing agent 2: water
iso 1: polymeric methylenediphenylene diisocyanate having an average molar mass of 337 g/mol and a functionality of 2.7
iso 2: polymeric methylenediphenylene diisocyanate having an average molar mass of 362 g/mol and a functionality of 2.8
stabilizer 1: polyether-polysiloxane copolymer
stabilizer 2: polyether-polydimethylsiloxane
stabilizer 3: silicone-glycol copolymer
stabilizer 4: polyether-polydimethylsiloxane copolymer
cat 1: 1-methylimidazole
cat 2: 30 parts of a bis(2-dimethylaminoethyl) ether in dipropylene glycol
cat 3: 40 parts of potassium formate, 6 parts of water, 54 parts of monoethylene glycol
cat 4: N,N-dimethylcyclohexylamine

Example 1 (Inventive)

53 parts of pentanedioic acid and 159 parts of polypropylene glycol having an MW of 420 g/mol were heated together at above 100° C. in a heating cabinet until all the pentanedioic acid had melted. This acid-polyol mixture was then homogenized and cooled down to room temperature before it was admixed with 2.1 parts of polyether-polysiloxane copolymer and 0.7 part of 1-methylimidazole. Addition of 337 parts of polymeric methylenediphenylene diisocyanate is followed by vigorous commixing with the lab stirrer for 10 s. Directly thereafter, the system was poured into a cube mold, where it underwent expansive foaming. Test specimens were taken from the polyamide-polyurethane foam thus produced and subjected to mechanical/thermal tests.

Example 2 (Inventive)

75 parts of methylenesuccinic acid and 175 parts of polypropylene glycol having an MW of 420 g/mol were heated together to 170° C. in a heating cabinet until all the methylenesuccinic acid had melted. This acid-polyol mixture was then homogenized and cooled down to 35° C. before it was admixed with 4 parts of polyether-polysiloxane copolymer and 1.2 part of 1-methylimidazole. Vigorous commixing with 300 parts of polymeric methylenediphenylene diisocyanate is effected with the lab stirrer for 10 s. The test specimens were produced and tested as described in example 1.

Example 3 (Inventive)

234.5 parts of dicarboxylic acid mixture having an average molar mass of 850 g/l and 115 parts of polypropylene glycol having an MW of 420 g/mol were heated together to 40° C. in a heating cabinet. This acid-polyol mixture was mixed with 5.4 parts of polyether-polysiloxone copolymer and 2.7 parts of 1-methylimidazole. Then, 315 parts of polymeric methylenediphenylene diisocyanate were weighed in, followed by commixing with the lab stirrer. The test specimens were produced and tested as described in example 1.

Comparator to Example 1

The components as per table 1 in the Comp. 1 column with the exception of iso 2 were weighed in together pro rata for an overall batch size of 350 parts and then homogenized. This mixture was vigorously admixed with 490 parts of iso 2 using a lab stirrer and then poured into the cube mold. The rigid foam rose in the mold and was left therein until fully cured.

Comparator to Example 2

The components as per table 1 in the Comp. 2 column with the exception of iso 1 were weighed in together pro rata for an overall batch size of 400 parts and then homogenized. This mixture was vigorously admixed with 680 parts of iso 1 using a lab stirrer and then poured into the cube mold. The rigid foam rose in the mold and was left therein until fully cured.

Properties of Products Obtained

TABLE 2

|  | Ex. 1 | Ex. 2 | Comp. 1 |
|---|---|---|---|
| density | 44 | 34 | 48 |
| compressive strength | 0.25 | 0.25 | 0.12 |
| relative deformation | 5.1 | 8.7 | 10 | density: core density [kg/m$^3$]
compressive strength in N/mm$^2$ to DIN 53421/DIN EN ISO 604
relative deformation [%] to DIN 53421/DIN EN ISO 604

Table 2 reveals that the inventive examples featuring rigid foams in the same density range have a higher compressive strength. The relative deformation values are likewise better for the inventive foams.

TABLE 3

|  | Ex. 1 | Ex. 2 | Comp. 2 |
|---|---|---|---|
| density | 44 | 34 | 39 |
| thermal conductivity | 23.7 | 23.2 | 32 |
| CCC | 91 | 86 | 92 | density: core density [kg/m$^3$]
thermal cond.: thermal conductivity [mW/m*K] Hesto A50 (mean temp. 23° C.)
CCC: closed-cell content [%] to DIN ISO 4590

Table 3 shows that the inventive rigid foams have a lower thermal conductivity than rigid foams in the same density range and with comparable closed-cell content.

TABLE 4

|  | Ex. 1 | Ex. 2 | Ex. 3 | Comp. 1 |
|---|---|---|---|---|
| density | 44 | 34 | 46 | 48 |
| CCC | 91 | 86 | 80 | 92 |
| TGA | 265 | 285 | 270 | 214 | density: core density [kg/m$^3$]
CCC: closed-cell content [%] to DIN ISO 4590
TGA: thermogravimetric analysis [° C.] to DIN EN ISO 11358, evaluated on absolute value basis at 95% of starting sample mass The inventive foams prove thermally more stable in thermogravimetric analysis than rigid foams of comparable density and closed-cell content.

The invention claimed is:

1. A process for producing a rigid polymer foam, the process comprising:
    reacting a reaction mixture comprising a poly isocyanate component A, a polyol component B, and a polycarboxylic acid component C in the presence of a Lewis base component D as a catalyst, and
    releasing carbon dioxide,
    wherein,
    the component D is N-methylimidazole, cyanuric acid, dicyandiamide, a derivative thereof, or a mixture thereof and the process is carried out without any other catalyst,
    the process is carried out in the absence of external blowing agent and any addition of water to the reaction mixture is avoided,
    the rigid polymer foam comprises urethane and amide groups in the polymer main chain and has a compressive stress at 10% relative deformation of not less than 80 kPa,
    the component A is contacted with a mixture of the components B, C, and D to form the reaction mixture, and
    based on the total combined weight of the components A, B, C, and D, the reaction mixture comprises:
    from 35 to 65 wt % of the component A,
    from 5 to 50 wt % of the component B,
    from 1 to 59 wt % of the component C, and
    from 0.01 to 3 wt % of the component D.

2. The process according to claim 1, wherein the component B has an average molecular weight of from 200 g/mol to 6000 g/mol.

3. The process according to claim 1, wherein the component A has an average molecular weight of from 100 g/mol to 750 g/mol.

4. The process according to claim 1, wherein the component B has an OH number of from 10 mg KOH/g to 1000 mg KOH/g.

5. The process according to claim 1, wherein the rigid polymer foam has a density of from 10 g/L to 200 g/L.

6. The process according to claim 1, wherein said reacting takes place in the presence of a foam stabilizer which optionally comprises a siloxane copolymer.

7. The process according to claim 1, wherein the component B is a polyether polyol or a polyester polyol.

8. The process according to claim 1, wherein the component C is a solute in the component B during said reacting.

9. A rigid polymer foam obtained from the process according to claim 1.

10. A polyol mixture, comprising:
a polyol component B,
a polycarboxylic acid component C, and
a Lewis base component D as a catalyst, which is N-methylimidazole, cyanuric acid, dicyandiamide, a derivative thereof, or a mixture thereof,
wherein
the component C is optionally a solute in the component B,
the polyol mixture does not comprise any other catalyst, and
based on the total combined weight of the components B, C, and D, the polyol component B is present at an amount of from 7.69 to 98.02 wt %, the polycarboxylic acid component C is present at an amount of from 1.85 to 92.17 wt %, and the Lewis base component D is present at an amount of from 0.02 to 8.57 wt %.

11. A material, comprising the rigid polymer foam according to claim 9,
wherein the material is a thermal insulation material or an engineering material.

12. The material according to claim 11, wherein the material is suitable as part of refrigerating or freezing appliances, appliances for hot water preparation or storage or parts thereof, or for thermal insulation of buildings, vehicles or appliances.

13. The material according to claim 11, wherein the material is an engineering material as a core foam of sandwich composites.

* * * * *